(No Model.)

J. RODGERS.
NUT LOCK.

No. 358,000. Patented Feb. 15, 1887.

Witnesses:
M. E. Harrison.
Josiah W. Ells

Inventor:
John Rodgers
Per. O D Levis
attorney.

UNITED STATES PATENT OFFICE.

JOHN RODGERS, OF PITTSBURG, PENNSYLVANIA.

NUT-LOCK.

SPECIFICATION forming part of Letters Patent No. 358,000, dated February 15, 1887.

Application filed March 4, 1886. Serial No. 194,073. (No model.)

*To all whom it may concern:*

Be it known that I, JOHN RODGERS, a citizen of the United States, residing at Pittsburg, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

My invention relates to an improvement in nut-locks, the object being to provide a nut-lock of simple and durable construction that may be readily applied or detached for the purpose of removing the nut; and with this end in view my invention consists in a single piece of spring-wire bent in a peculiar form, one end of which is looped or wound about the bolt, as will be more fully set forth hereinafter.

Figure 1:
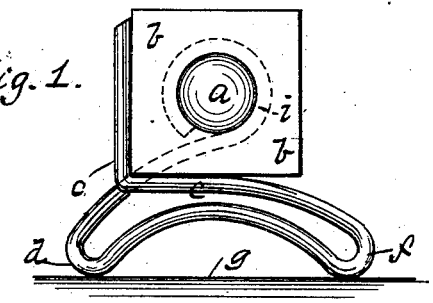
Figure 2:
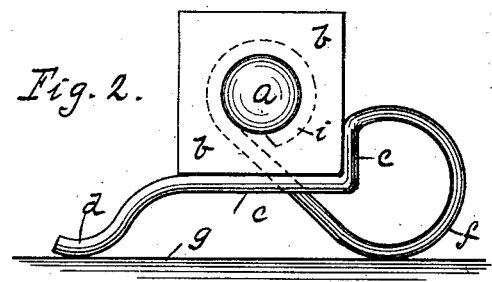
Figure 5:
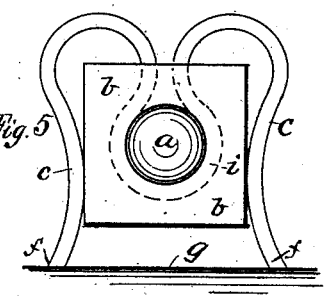
Figure 3:
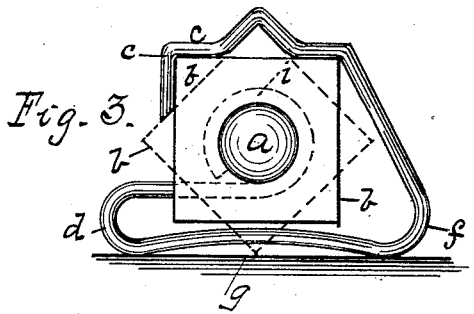
Figure 4:
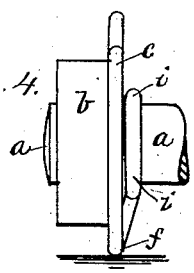

In the accompanying drawings, Figure 1 is a side elevation of my improved nut-lock as applied to the nut and bolt of a railway-rail joint. Fig. 2 is a side elevation of a modification of my improvement. Fig. 3 is a side elevation of another modification, showing the manner of attaching the same to the nut, the sides of which are in a horizontal and vertical position, or the nut having a quarter-turn, as shown by the dotted lines on the drawings. Fig. 4 is a side elevation of the same. Fig. 5 is a front elevation of a modification of the others shown.

To put my invention into practice with the ordinary bolt, $a$, and nut $b$ of a railway-rail joint, I provide a spring-wire or light rod, $c$, and loop one end of the same about the bolt $a$, which takes the place of a washer. The wire or rod $c$ is now bent downwardly a short distance, and with a reverse curve forms an arch beneath the nut $b$. The curve of the rod $c$ is again reversed and allowed to rest against the under side of the nut $b$, and continuing along this side until bent at a right angle to fit neatly along one of the vertical sides of the nut $b$. The short curves $d$ and $f$ on the lower portion of the wire $c$ rest on the outwardly-projecting flanges $g$ of the railway-rail.

In operation the wire $c$ is first bent in the form described. The loop $i$ is placed over the bolt $a$ and the nut $b$ screwed in place. The locking portion, which is bent at a right angle, is forced in place, the short curves $d$ and $f$ resting on the flange $g$ of the rail, thus preventing the nut $b$ from turning or becoming loose.

The wire or rod may be bent in a number of ways equally as effective as that described, (see Figs. 2 and 3,) without departing from the spirit of my invention. Therefore I do not confine myself to the exact forms as shown and described.

I prefer to use a nut-lock such as shown at Fig. 3 when an angular fish-plate is used in making the joint of the rails. The space between the lower side of the nut $b$ and the flange of the splice-bar $g$ is not sufficient to allow either of the other two shown to be used.

It will be observed that the coil $i$ serves as the nut-washer, and that I have two points, $c$ $c$, of impingement against two edges of the nut, and two points of impingement upon the rail-base.

I am aware that in Letters Patent No. 167,469 a nut-locking device is shown having but one bearing against the edge of the nut, and but one bearing below the lower edge of the nut; and such device I disclaim, believing it to be inefficient for the purpose intended.

Having thus described my invention, what I claim, and desire to secure by Letters Patent, is—

1. The improved wire nut-lock consisting of the coil $i$, bent at $c$ $c$ to impinge at two points against two edges of the nut, and arched below the nut so as to afford two points, $d f$, of impingement upon the rail-flange, substantially as described.

2. The combination, in a wire nut-lock formed of a single piece, of the rectangle $c$ $c$, the two bearings $d f$, and the coil $i$, as shown and described.

JOHN RODGERS.

Witnesses:
W. C. BARR,
M. E. HARRISON.